July 12, 1960   F. J. BELL   2,944,676
STORAGE RACK

Filed April 14, 1958   2 Sheets-Sheet 1

INVENTOR.
FRANCIS J. BELL
BY
ATTORNEYS

United States Patent Office 2,944,676
Patented July 12, 1960

2,944,676

STORAGE RACK

Francis J. Bell, Roxborough, Pa., assignor to The Allen Iron & Steel Company, Norristown, Pa., a corporation of Pennsylvania Filed Apr. 14, 1958, Ser. No. 728,135

11 Claims. (Cl. 211—148)

This invention relates to a storage rack which is particularly useful for the storage of pallets and the like.

This invention provides a storage rack which breaks down into elements of a convenient size for shipping and yet can be assembled without the use of nuts and bolts or other separate fittings.

The rack of this invention is advantageous from the point of view of cost since it is readily fabricated from standard items such as angle irons and bar stock.

Other objects of the invention will become apparent on reading the following description in conjunction with the following drawings in which.

Figure 1:
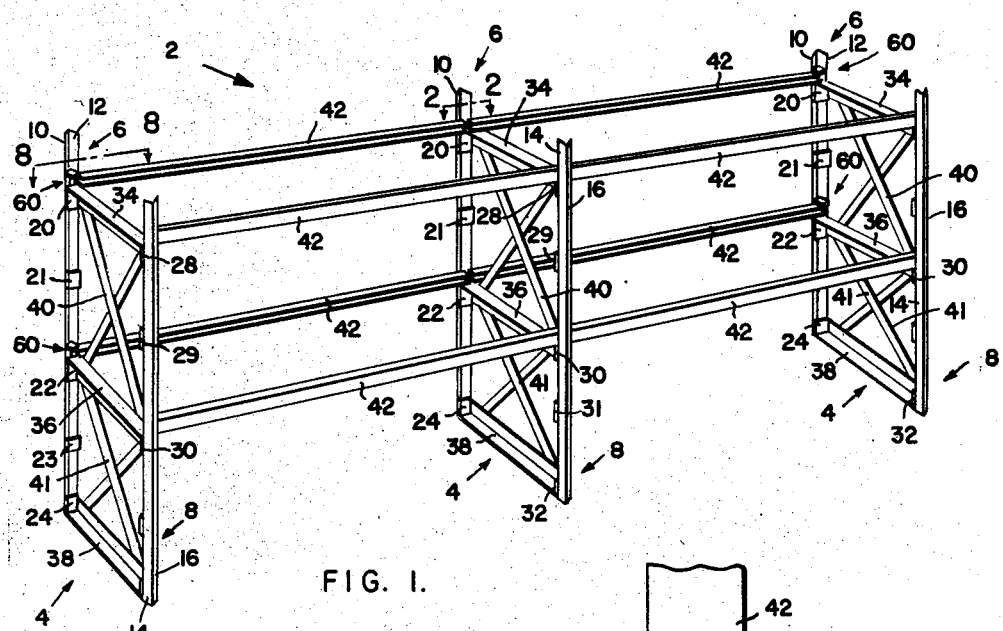
Figure 1 is a front perspective view of a storage rack in accordance with this invention.

As shown in Figure 1, a storage rack 2 in accordance with this invention has a plurality of frame members 4 each having a pair of opposed upright members 6 and 8. Upright member 6 has a pair of sides 10 and 12 forming a right angle facing inwardly. Similarly, upright member 8 has a pair of sides 14 and 16 forming a right angle facing inwardly. If the sides 10 and 12 and 14 and 16 were extended they would intersect at right angles. Members 6 and 8 may conveniently be conventional angle irons.

Member 6 has welded to its sides supporting plates 20, 21, 22, 23 and 24 and member 8 has welded to its sides supports plates 28, 29, 30, 31 and 32. A brace 34 is welded to plates 20 and 28, a brace 36 is welded to plates 22 and 30 and a brace 38 is welded to plates 24 and 32. An X brace 40 is secured to braces 34 and 36 and an X brace 41 is secured to braces 36 and 38.

Figure 2:
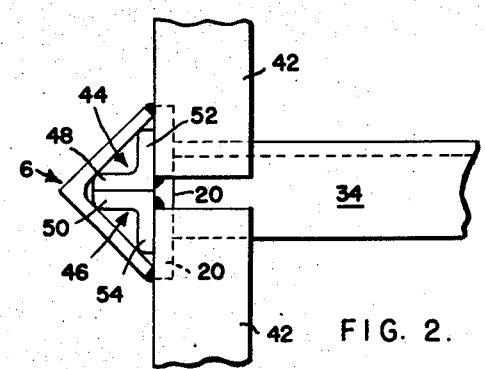
Figure 2 is a vertical section taken on the plane indicated by the line 2—2 in Figure 1.
Figure 3:
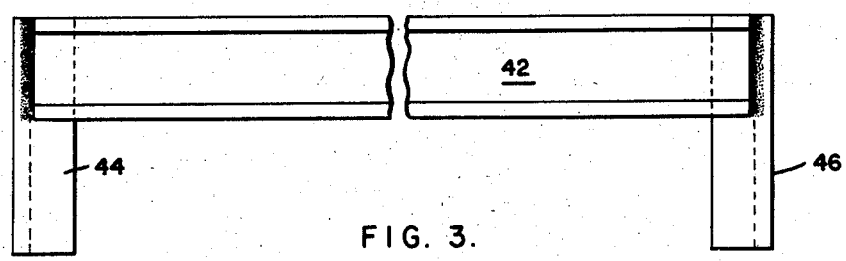
Figure 3 is a front elevation of a stringer of the rack of Figure 1.
Figure 4:
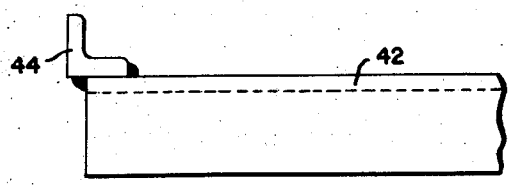
Figure 4 is a plan view of a portion of the stringer of Figure 3.
Figure 5:
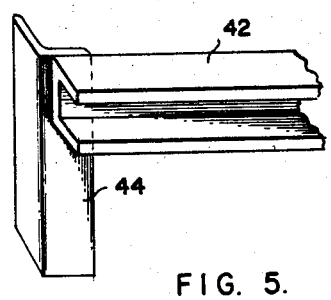
Figure 5 is a front perspective view of one end of the stringer of Figure 3.
Figure 6:
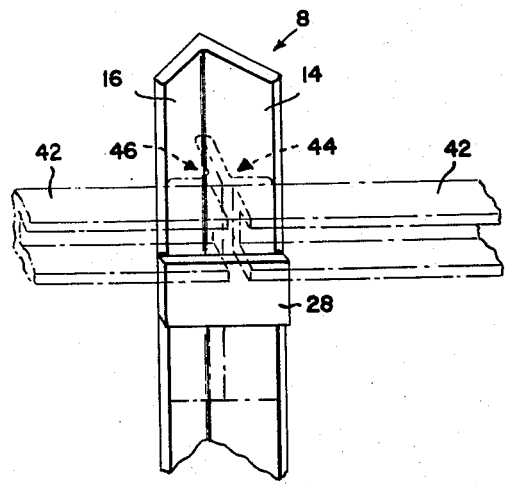
Figure 6 is a top perspective view of a pair of stringers engaging an upright member of the rack of Figure 1.

Frames 4 are connected by horizontal stringers 42 which are supported on the selected supporting plates. A right angle bracket 44 is secured at one end of each stringer 42 and a right angle bracket 46 is secured at the other end of each stringer. Brackets 44 and 46 depend below the stringers and preferably extend beyond the ends of the stringers as illustrated in Figure 6. Sides 48 and 50 of brackets 44 and 46 abut against each other, the outer ends of these sides engaging an upright member, for example, member 6 as shown in Figure 2 or member 8 as shown in Figure 6. Sides 52 and 54 of brackets 44 and 46 engage a supporting plate and the outer ends of these sides engage an upright member. As shown in Figure 2, sides 52 and 54 engage supporting plate 20 and the outer ends engage upright member 6. Thus, brackets 44 and 46 are locked against movement in a horizontal plane and prevent the stringers from moving in this plane.

Figure 7:
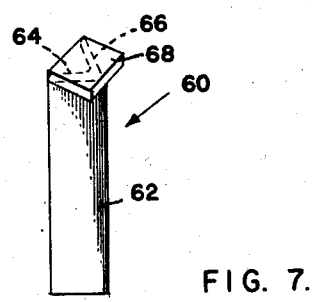
Figure 7 is a top perspective view of a key of the rack of Figure 1.
Figure 8:
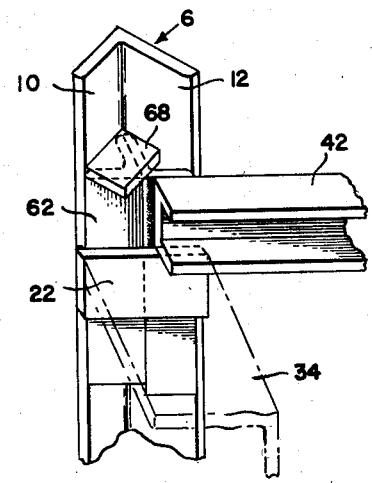
Figure 8 is a top perspective view showing the key of Figure 7 in use.

The stringers 42 are secured to the end frame members 4 as described above with the exception that a key 60 (see Figures 7 and 8) is inserted adjacent the right angle member of the stringer. Key 60 has a right angle bracket 62 having sides 64 and 66. A stop plate 68 engages the adjacent right angle bracket 44 to hold the key 60 in position.

It is not desired to be limited except as set forth in the following claims.

What is claimed is:

1. A storage rack comprising a pair of end frames each having a pair of opposed upright members each having two sides forming an angle facing inwardly, supporting plates, each of said upright members having secured to the side edges thereof at least one of said plates, horizontal stringers supported on said plates to provide load supporting surfaces, a right angle bracket secured to each end of each of said stringers and depending below said stringers, said right angle bracket slidably engaging its adjacent upright member and supporting plate and a right angle key member slidably engaging each right angle bracket and its adjacent upright member and supporting plate to lock the right angle bracket against movement in a horizontal plane.

2. A storage rack comprising a pair of end frames each having a pair of opposed upright members each having two sides forming a right angle facing inwardly, supporting plates, each of said upright members having secured to the side edges thereof at least one of said plates, horizontal stringers supported on said plates to provide load supporting surfaces, a right angle bracket secured to each end of each of said stringers and depending below said stringers, said right angle bracket slidably engaging its adjacent upright member and supporting plate and a right angle key member slidably engaging each right angle bracket and its adjacent upright member and supporting plate to lock the right angle bracket against movement in a horizontal plane.

3. A storage rack comprising a pair of end frames and an intermediate frame located between said end frames, each of said frames having two sides forming an angle facing inwardly, supporting plates, each of said upright members having secured to the side edges thereof at least one of said plates, horizontal stringers supported on said plates, a right angle bracket secured to each end of said stringers and depending below said stringers, the right angle brackets adjacent the intermediate frame abutting against each other and slidably engaging the adjacent upright member and plate, the right angle brackets adjacent each end frame slidably engaging the adjacent upright member and plate, a right angle key member slidably engaging each right angle bracket adjacent an end frame and slidably engaging the adjacent upright member and supporting plate.

4. A storage rack comprising a pair of end frames and an intermediate frame located between said end frames, each of said frames having two sides forming a right angle facing inwardly, supporting plates, each of said upright members having secured to the side edges thereof at least one of said plates, horizontal stringers supported on said plates, a right angle bracket secured to each end of said stringers and depending below said stringers, the right angle brackets adjacent the intermediate frame abutting against each other and slidably engaging the adjacent upright member and plate, the right angle brackets adjacent each end frame slidably engaging the adjacent upright member and plate, a right angle key member slidably engaging each right angle bracket adjacent an end frame and slidably engaging the adjacent upright member and supporting plate.

5. A storage rack comprising a pair of end frames and a plurality of intermediate frames, each frame having a pair of opposed upright members having two sides forming an angle facing inwardly, supporting plates to each of said upright members having secured to the side edges thereof at least one of said plates, horizontal stringers supported on said plates, a right angle bracket secured to each end of said stringers and depending below said stringers, the brackets adjacent the intermediate frames slidably engaging the adjacent upright member supporting plate and right angle bracket member and the right angle brackets adjacent the end frames slidably engaging the adjacent upright member and plate, a right angle key member slidably engaging each right angle bracket adjacent an end frame and slidably engaging the adjacent upright member and supporting plate.

6. A storage rack comprising a pair of end frames and a plurality of intermediate frames, each frame having a pair of opposed upright members having two sides forming a right angle facing inwardly, supporting plates, each of said upright members having secured to the side edges thereof at least one of said plates, horizontal stringers supported on said plates, a right angle bracket secured to each end of said stringers and depending below said stringers, the brackets adjacent the intermediate frames slidably engaging the adjacent upright member supporting plate and right angle bracket member and the right angle brackets adjacent the end frames slidably engaging the adjacent upright member and plate, a right angle key member slidably engaging each right angle bracket adjacent an end frame and slidably engaging the adjacent upright member and supporting plate.

7. In a storage rack having upright members and horizontal stringers supported thereby, an upright member having two sides defining an angle, a plate secured to said said upright member and extending across said sides to define a space between the plate and the sides, a pair of horizontal stringers having their ends terminating above said plate, each of said stringers having a projection extending downwardly within said space and parallel to said upright member, said projections engaging each other as well as the portion of said plate within said space and having portions extending outwardly to engage said upright member, whereby said plate and upright member restrict horizontal movement of said projections and lock said stringers in position.

8. In a storage rack having upright members and horizontal stringers supported thereby, an upright member having sides defining an open channel, a transverse member secured to said upright member intermediate the length thereof and spanning said channel, a pair of horizontal stringers having their ends terminating adjacent said transverse member, each of said stringers having a projection extending vertically into said channel between said upright member and transverse member, said projections engaging each other and having portions extending to the sides of said channel, whereby horizontal movement by said projections and their respective stringers is restricted.

9. Structure according to claim 8, wherein the cross-sections of said projections are identical, said projections being complementary and each occupying a half of the space represented by said channel.

10. A storage rack having upright members and horizontal stringers supported thereby, an upright member having sides defining an open channel intermediate the length of said upright member, means spanning said channel to define a space therein, a pair of aligned horizontal stringers abutting each other in the vicinity of said means and complementary means on said stringers extending into and substantially filling said space, whereby horizontal movement of said complementary means within said channel is prevented.

11. In a storage rack having upright members and horizontal stringers supported thereby, an upright member having sides defining an open channel, a transverse member secured to said upright member intermediate the length thereof and spanning said channel, a horizontal stringer having an end terminating above said transverse member, a projection on said horizontal stringer extending downwardly into said space and engaging the sides thereof defined by said upright member and transverse member, and a key member within said space occupying substantially the remainder of said space to limit horizontal relative movement of said projection and its associated stringer.

References Cited in the file of this patent

UNITED STATES PATENTS

| | | |
|---|---|---|
| 327,939 | Garrison | Oct. 6, 1885 |
| 1,655,593 | Bulman | Jan. 10, 1928 |
| 2,654,487 | Degener | Oct. 6, 1953 |
| 2,815,130 | Franks | Dec. 3, 1957 |
| 2,833,421 | Skubic | May 6, 1958 |